E. B. HOUSE.
BROILER.
APPLICATION FILED SEPT. 25, 1917.

1,286,640.

Patented Dec. 3, 1918.

Inventor
Elena B. House

Attorneys

UNITED STATES PATENT OFFICE.

ELENA B. HOUSE, OF RENO, NEVADA.

BROILER.

1,286,640.  Specification of Letters Patent.  Patented Dec. 3, 1918.

Application filed September 25, 1917. Serial No. 193,158.

*To all whom it may concern:*

Be it known that I, ELENA B. HOUSE, a citizen of the United States, residing at Reno, in the county of Washoe and State of Nevada, have invented new and useful Improvements in Broilers, of which the following is a specification.

The present invention relates to cooking utensils, and more particularly to an improved type of broiler.

An object of the present invention is to provide a broiler of a construction such that the juices of meat and the like placed on the broiler may be collected during the cooking of the meat; a broiler which supports the meat or other substance at spaced apart points; and a broiler which is provided with ways or channels between the supports for collecting the juices and for conveying the same to a suitable receptacle comprising part of the broiler.

The invention further aims at the provision of a broiler of this type which comprises relatively few parts, which may be constructed from sheet metal, and which occupies but relatively small space.

The above, and various other objects and advantages of this invention will be in part described, and in part understood, from the following detailed description of the present preferred embodiment, the same being illustrated in the accompanying drawing, wherein—

Figure 1:
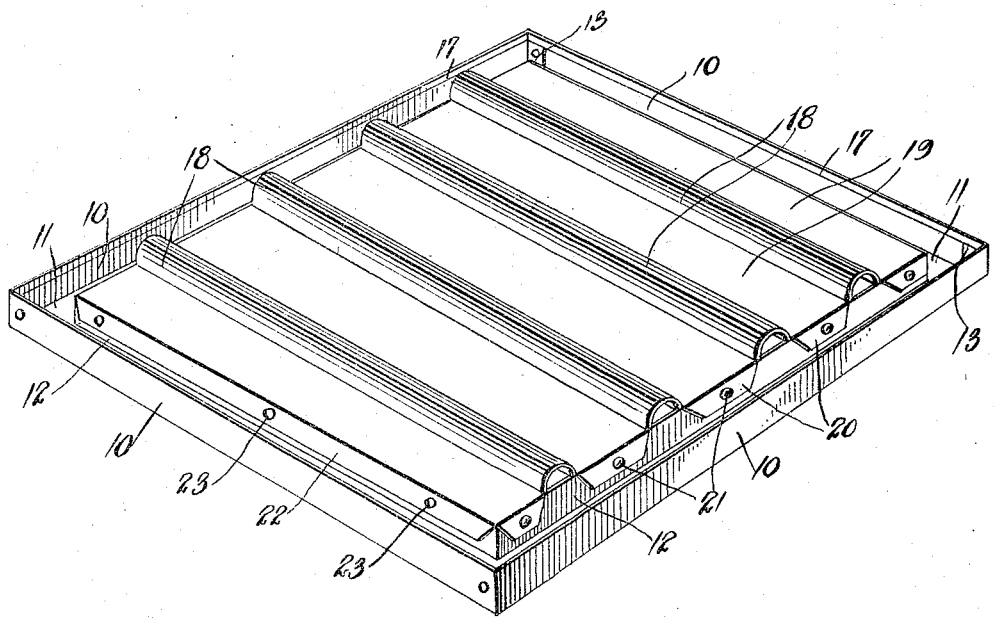
Figure 1 is a perspective view of a broiler constructed according to the present invention.
Figure 2:
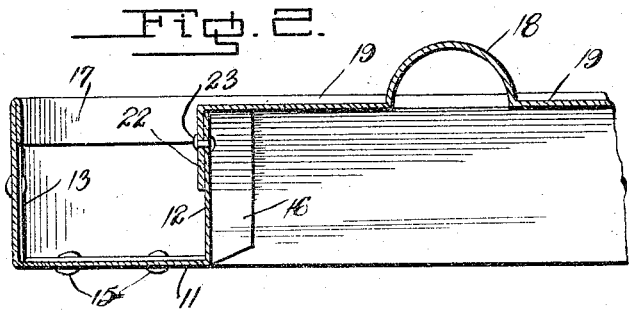
Fig. 2 is a fragmentary enlarged section taken through one end of the broiler.
Figure 3:
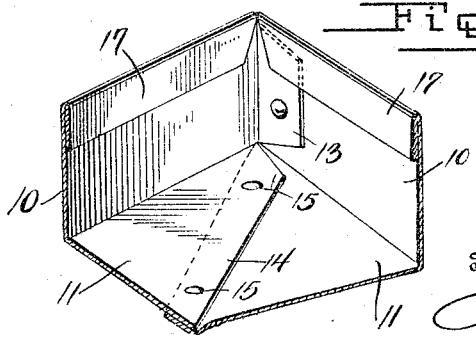
Fig. 3 is a fragmentary perspective view, showing the interior of one of the corners of the broiler.

Referring to the drawing, the broiler comprises, broadly, a frame in the form of a trough and a support carried by the frame, filling the same and provided with ways or channels opening into the trough of the frame for carrying off the juices from meat or the like, placed on the support and collecting the juices in the trough.

The frame may be of any suitable construction and configuration, and in the present instance is disclosed as of rectangular formation, and composed of side members 10, each preferably constructed from sheet metal and being U-shaped in cross-section with the outer wall 10, the bottom wall 11, and the inner wall 12.

The ends of the side members 10 are preferably at substantially 45° to form a complete rectangular frame when the side members are assembled and the outer wall 10 of each member is provided at one end with a lip 13 bent at right angles to the wall and adapted to engage the inner side of the wall 10 of the adjacent member. Rivets or the like, may be secured through the lip 13 and the wall 10 against which the lip engages to unite the outer wall 10 of the adjacent section or member. The bottom wall 11 of each section or member is also provided at one end with a lip 14 adapted to overlap the adjacent end portion of the bottom wall 11 of the adjacent section or member, the overlapping part of the adjacent members being secured together by rivets 15 or the like.

The inner wall 12 of each section is provided at one end with a lip 16 bent at right angles to the wall and adapted to overlap the inner side of the wall 12 of the adjacent section.

For the purpose of reinforcing the frame, and to provide a relatively smooth upper outer marginal edge the upper marginal edge portions are overturned inwardly to form beads or flanges 17 to reinforce the frame.

The plate forming the support is preferably of a width equal to the width of the inner marginal edge of the frame and is provided along its opposite lateral edges with ears 20 bent downwardly at substantially right angles to the plane of the plate and adapted to overlap the upper edge of the inner wall of the frame. Rivets 21 or the like, secure the ears 20 to the inner walls 12 of the frame members and hold the supports in position upon the frame. The plate forming the support has upwardly crimped portions 18 formed therein. The upwardly crimped supports 18 are open at opposite ends, and the heat entrapped within the frame beneath the supports is adapted to pass through the open ends of the supports and into contact with the substance placed upon the broiler. The ends of the plate are preferably turned down to form attaching flanges 22 overlapping the inner walls of the end members of the frame, and may be secured thereto by rivets 23 or the like, for reinforcing the support and the frame.

In use, the broiler is placed over the burner opening of a stove, or the like, and the heat rising through the opening passes into the interior of the frame and beneath the supports. The material to be broiled is placed upon the supports 18, and the heat rising through the frame passes out of the open ends of the supports into contact with the material, and as the heat is pocketed or trapped within the frame, the supports are thereby maintained at a relatively high temperature. During the broiling operation, the juice dripping from the meat or other substance, is caught in the channels or ways 19 and is carried thereby to the annular trough of the frame where the juice is deposited and retained.

The device thus formed may be constructed substantially wholly from sheet metal and is adapted to be secured together at the corners of the frame in fluid tight relation to prevent waste of the juices and other fluid substances collected in the trough.

It is of course understood that various changes and modifications may be made in the details of construction and design of the above specifically described embodiment of this invention, without departing from the spirit thereof, such changes and modifications being restricted only by the scope of the following claim.

What is claimed is:

In a broiler, the combination of a plurality of sheet metal side members bent substantially U-shaped and having outstanding tongues on one end adapted to overlap the adjacent wall portions of the adjacent side members to connect the side members and form a rectangular trough shape frame; a sheet of metal secured at opposite ends to and engaging over the inner walls of the U-shaped side members, said sheet of metal being crimped transversely at spaced apart points throughout its length to provide open ended upstanding supports for the substance to be broiled, the spaces between the supports communicating with the interior of the U-shaped side members and the open ends thereof serve to discharge heat from beneath the sheet of metal.

ELENA B. HOUSE.

Copies of this patent may be obtained for five cents each, by addressing the "Commissioner of Patents, Washington, D. C."